Patented May 31, 1949

2,472,007

UNITED STATES PATENT OFFICE 2,472,007

PROCESS OF PREPARING ISOALLOXAZINES

Walter G. Farkas, Palisades Park, and Leo A. Flexser, Elizabeth, N. J., assignors to Hoffmann-La Roche Inc., Nutley, N. J., a corporation of New Jersey No Drawing. Application October 17, 1946, Serial No. 703,716

13 Claims. (Cl. 260—211)

This invention relates to a new method for producing isoalloxazines.

In recent years, the isoalloxazines have become an important class of chemical compounds. In particular, vitamin $B_2$, or riboflavin, which is 6,7-dimethyl, 9-(D-1-ribityl) isoalloxazine, has assumed considerable economic importance and is manufactured synthetically on a large scale.

The isoalloxazines are customarily prepared by reaction of the appropriately substituted aromatic ortho diamine (I) with alloxan (II) in accordance with the following equation:

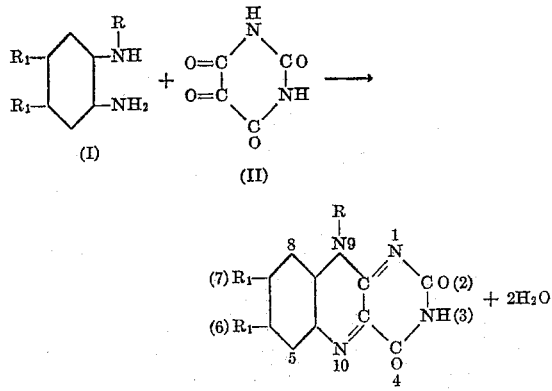

wherein $R_1$ and R represent the heretofore employed substituents.

In the case of riboflavin, $R_1$ is methyl and R is D-ribityl or a polyacyl-D-ribityl, as for example, tetraacetyl-ribityl. In the latter instance a polyacylated riboflavin is first obtained which is then hydrolyzed to riboflavin.

More recently, isoalloxazines have also been prepared by reaction of aromatic ortho amino azo compounds (III) with barbituric acid (IV) as follows: (Tishler and Carlson, U. S. Patent 2,350,376).

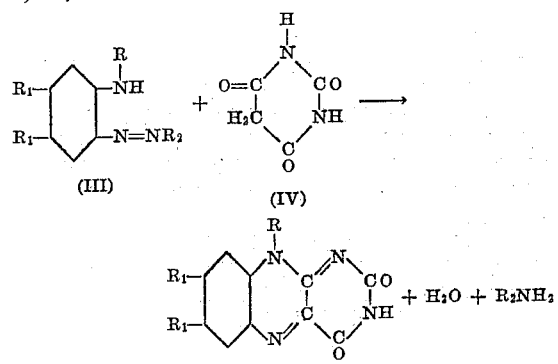

In the case of riboflavin, R and $R_1$ have the connotation given above and $R_2$ is aryl.

Amino azo compounds such as III may also be condensed with alloxantin or dialuric acid to give isoalloxazines in accordance with U. S. Patent 2,374,661 issued to Bergel, Cohen and Haworth.

In all of the above syntheses, either of the desired starting compounds I and III is best prepared from the same appropriately substituted aromatic amine A as follows: (Karrer, U. S. Patent 2,237,074).

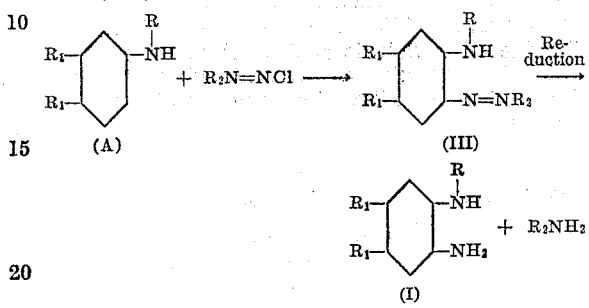

For riboflavin, R, $R_1$ and $R_2$ have the same connotation as hereinabove described, and the initial starting compound A is known as N-(D-1-ribityl)-3,4-xylidine when the ribityl group is unsubstituted, or more simply as ribityl xylidine.

We have now discovered that N-aliphatic-substituted aromatic amines or the salts thereof with mineral acids, for example, ribityl or isoaribityl xylidine or the hydrochlorides thereof can be condensed directly with a violuric acid, as, for example, violuric acid, 2-imino-violuric acid and the like to yield isoalloxazines in a single step. The intermediate steps required in the previously mentioned syntheses, the employment of the more expensive and complicated diamines and amino diazo compounds are thereby eliminated with a consequent substantial saving of materials, labor and expense.

In its general form, our new synthesis may be written in accordance with the following equation:

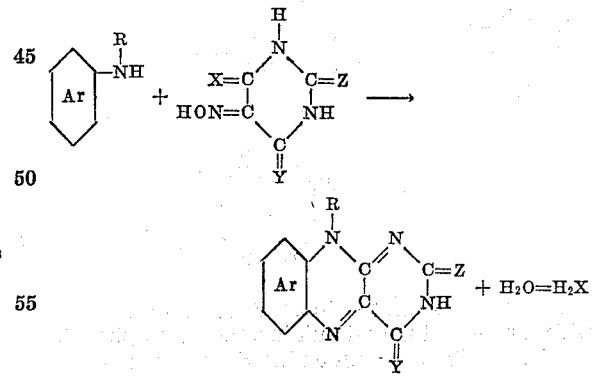

where the symbol

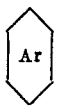

denotes an aryl radical, R is selected from the group consisting of alkyl, polyhydroxyalkyl and polyacyloxyalkyl radicals and X, Y and Z are selected from the group consisting of oxygen, sulfur, and imino and cyanimino radicals.

R, for instance can be an ethyl, methyl, propyl radical and the like, a polyhydroxy aliphatic radical as, for example, ribityl, arabityl, isoaribityl, and the like; or a polyacyloxyalkyl radical such as tetraacetyl ribityl, and the like. It is such substituents and the like, which it is intended to cover by the expression "N-aliphatic substituted" as employed in the specification and claims.

To the best of our knowledge, isoalloxazines and particularly riboflavin, have not hitherto been prepared by condensation of N-substituted aromatic amines with violuric acid or derivatives thereof. We are aware that certain amino alloxazines (not isoalloxazines) have been prepared by condensation of metaphenylene diamine with violuric acid and thiovioluric acid. Piloty, Annalen, 333, 44, (1904) condensed meta-phenylene diamine with violuric acid to obtain a product which he regarded as 7-amino alloxazine, although 5-amino alloxazine could also have been formed:

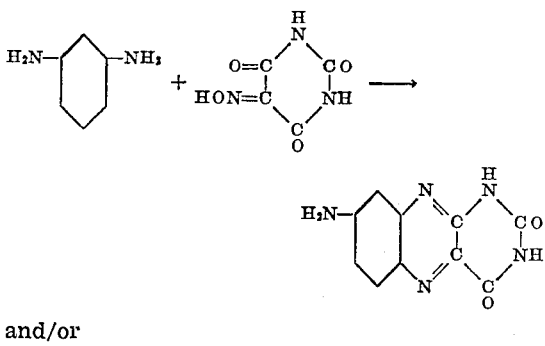

and/or

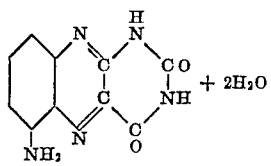

Ganapati, J. Indian Chem. Soc. 15 77 (1938) likewise regarded the product as 7-amino alloxazine and also prepared 7-amino-2-thio-alloxazine by condensation of thiovioluric acid with meta-phenylene diamine:

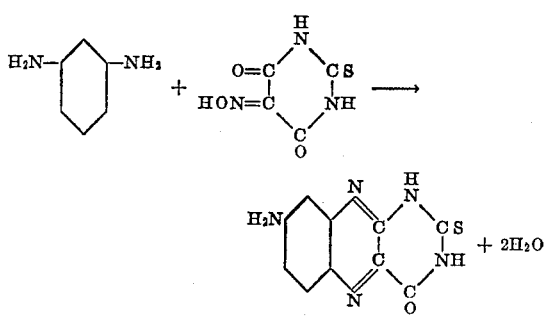

Ganapati attempted to condense violuric acid with meta- and para-toluidine, m-amino phenol, m-nitro aniline, m-amino phenyl urea, m-amino acetanilide, ortho and para-phenylene diamine and beta-naphthyl amine but did not obtain any alloxazines, from which he concluded (P. 79) that "From these results it appears that the m-amino group is absolutely specific for this type of condensation."

Kuhn and Cook, Ber. 70, 763 (1937) attempted repeatedly to prepare alloxazine by condensation of aniline with violuric acid but were unsuccessful and concluded that while the reaction seems possible on paper, it cannot be made to proceed.

In the light of the above findings and reports of others, our discovery that isoalloxazines can be formed at all and particularly in the absence of a meta amino group is all the more surprising and unexpected.

According to our invention, the condensation between the N-substituted aromatic amines and violuric acid and its derivatives to form isoalloxazines is preferably carried out in the presence of a solvent. A wide variety of solvents, either aqueous or organic solvents, have been found to be suitable. Preferably we employ water, but acetic acid, propionic acid, phenol, ethylene glycol, acetamide and dioxane have also been found highly suitable. When methanol, ethanol, pyridine are employed in the condensation with violuric acid, the yields obtained are smaller than in the case of the previously mentioned solvents. Boric acid can be added to the reaction mixture if desired. The reaction is preferably carried out at an elevated temperature, which can range from about 50–150° C., the preferred temperature being about 100–135° C.

The N-aliphatic substituted aromatic amine may be used directly or in the form of its salt with a mineral acid, one or the other usually giving a superior yield depending on the solvent employed as well as the nature of the substituent on the violuric acid. For example, ribityl xylidine base, when reacted with violuric acid in water gives a higher yield of riboflavin than when the hydrochloride is used, but the reverse is the case when the reaction is carried out with imino-violuric acid. While in general the base and the salt are employed separately in carrying out the reaction, they can also be used as a mixture.

The violuric acids which can be employed in the reaction may be represented by the following general formula:

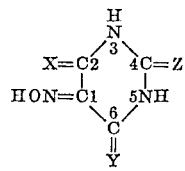

where X, Y and Z have the same significance as hereinbefore mentioned. As examples of violuric acids, there are mentioned violuric acid, 2-imino-violuric acid, 4-thiovioluric acid, 4-imino-violuric, 2,4-di-imino-violuric acid, 4-cyanimino-2-imino-violuric acid, 4-thio-2-imino-violuric acid, and 4-thio-2,6-di-imino-violuric acid and the like.

The following examples illustrate the method of practicing our invention. It is, however, to be understood that they are intended by way of illustration and not limitation.

*Example 1*

A mixture of 25.5 grams of N-(D-1-ribityl)-3,4-dimethyl aniline, 25 grams of violuric acid, 6.2 grams of boric acid and 200 cc. of water was boiled under reflux for 5 hours with good agitation. The color changed to dark brown orange and the solution became strongly fluorescent in a manner characteristic of riboflavin.

To recover the riboflavin, the solution was then treated as follows:

The solution was cooled and the pH adjusted to 4.0. A freshly prepared solution of 42 grams of sodium hydrosulfite (Na2S2O4) was added and the mixture allowed to stand for four hours. The tan precipitate of dihydro riboflavin was filtered off, suspended in water and reoxidized to riboflavin by agitation with air. The riboflavin so obtained was then recrystallized in the usual manner and dried.

When tetraacetyl-ribityl-xylidine is employed instead of N-(D-1-ribityl)-3,4-dimethyl aniline, there can be obtained, in a similar manner, 6,7-dimethyl-9-tetraacetyl-ribityl isoalloxazine.

In a similar manner, but employing 3,4-dimethylphenyl-D-isoarabinosamine, instead of N-(D-1-ribityl)-3,4-dimethyl aniline, there may be obtained the 6,7-dimethyl, 9-(D-1'-isoaribityl) isoalloxazine which can be converted by any suitable method into riboflavin, for example, as described in Kamlet, U. S. Patent 2,406,774.

*Example 2*

A mixture of 5.1 grams of N-(D-1-ribityl)-3,4-xylidine, 7.0 grams of violuric acid and 50 grams of phenol was agitated at 120° C. for seven hours. The mixture was then cooled and diluted with ethanol. The precipitate which formed was filtered and washed with alcohol and dried. The weight was 2.66 grams and it was found to contain 15.6% riboflavin. The major part of the riboflavin remained dissolved in the mother liquor from which it was isolated by the method of Example I.

When N-methyl aniline is substituted for N-ribityl-3,4-xylidine, and the reaction carried out in a manner similar to Example 2, there is obtained 9-methyl isoalloxazine.

*Example 3*

A mixture of 5.82 grams of the hydrochloride of ribityl xylidine, 7.0 grams of 2-imino-violuric acid and 50 cc. of propionic acid was refluxed with stirring for seven hours. It was then cooled and diluted with water and the precipitate filtered off, washed with alcohol and dried. There were obtained 4.2 grams of solid containing 38% riboflavin.

We claim:

1. The process of producing isoalloxazines which comprises reacting a compound selected from the group consisting of an N-mono-aliphatic substituted phenyl amine and the mineral acid salts thereof with a violuric acid which can be represented by the formula:

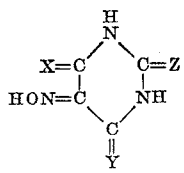

X and Y being selected from the group consisting of oxygen and imino, and Z being selected from the group consisting of oxygen, sulfur, imino and cyanimino.

2. The process of claim 1 in which the reaction is carried out in the presence of a solvent.

3. The process of producing isoalloxazines which comprises reacting a compound selected from the group consisting of an N-mono-aliphatic-substituted phenyl amine and the mineral acid salts thereof with a violuric acid in the presence of a solvent at an elevated temperature said violuric acid being represented by the formula:

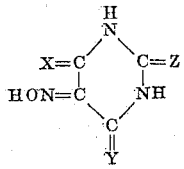

X and Y being selected from the group consisting of oxygen and imino, and Z being selected from the group consisting of oxygen, sulfur, imino and cyanimino.

4. The process of producing a ribityl-isoalloxazine which comprises reacting N-ribityl-3,4-xylidine with a violuric acid which can be represented by the formula:

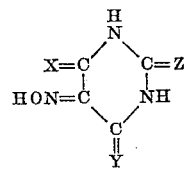

X and Y being selected from the group consisting of oxygen and imino, and Z being selected from the group consisting of oxygen, sulfur, imino and cyanimino.

5. The process of claim 4 wherein a mineral acid salt of N-ribityl-3,4-xylidine is employed in the reaction.

6. The process of producing a ribityl-isoalloxazine which comprises reacting N-tetraacetyl-ribityl-3,4-xylidine with a violuric acid which can be represented by the formula:

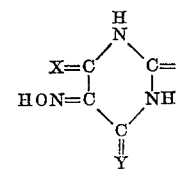

X and Y being selected from the group consisting of oxygen and imino, and Z being selected from the group consisting of oxygen, sulfur, imino and cyanimino.

7. The process of producing a ribityl isoalloxazine which comprises reacting 3,4-dimethylphenyl-isoarabinosamine with a violuric acid which can be represented by the formula:

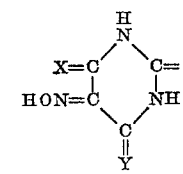

X and Y being selected from the group consisting of oxygen and imino, and Z being selected from the group consisting of oxygen, sulfur, imino and cyanimino.

8. The process of producing isoalloxazines which comprises reacting a compound selected from the group consisting of an N-mono-aliphatic-substituted phenyl amine and the mineral acid salts thereof with violuric acid.

9. The process of producing isoalloxazines which comprises reacting a compound selected from the group consisting of an N-mono-aliphatic-substituted phenyl amine and the mineral acid salts thereof with 2-imino-violuric acid.

10. The process which comprises reacting ribityl xylidine with violuric acid to produce riboflavin.

11. The process of producing riboflavin which comprises reacting ribityl xylidine with violuric acid in water.

12. The process which comprises reacting ribityl xylidine hydrochloride with 2-imino-violuric acid to produce riboflavin.

13. The process which comprises reacting 3,4-dimethylphenyl-isoaribinosamine with violuric acid to produce 6,7-dimethyl, 9-isoaribityl isoalloxazine.

WALTER G. FARKAS.
LEO A. FLEXSER.

REFERENCES CITED

The following references are of record in the file of this patent:

UNITED STATES PATENTS

| Number | Name | Date |
|---|---|---|
| 2,342,438 | Tishler | Feb. 22, 1944 |
| 2,406,774 | Kamlet | Sept. 3, 1946 |

OTHER REFERENCES

Kuhn et al. Berichte, 70, pages 761–764 (1937).